United States Patent [19]
Dlugos

[11] Patent Number: 5,909,013
[45] Date of Patent: *Jun. 1, 1999

[54] DIMENSIONAL WEIGHING UTILIZING A FOLLOWING ARM MECHANISM

[75] Inventor: Daniel F. Dlugos, Shelton, Conn.

[73] Assignee: Pitney Bowes Inc., Stamford, Conn.

[*] Notice: This patent is subject to a terminal disclaimer.

[21] Appl. No.: 08/775,550

[22] Filed: Dec. 31, 1996

[51] Int. Cl.⁶ .......................... G01G 19/22; G01G 19/40; B43L 5/00; G01B 5/26
[52] U.S. Cl. ..................... 177/25.11; 177/25.13; 177/25.15; 33/1 V; 33/124; 33/546
[58] Field of Search ............................. 33/1 V, 121, 122, 33/123, 124, 712, 773, 809, 810, 546; 177/4, 25.11, 25.12, 25.13, 25.14, 25.15; 364/564

[56] References Cited

U.S. PATENT DOCUMENTS

| | | | |
|---|---|---|---|
| 2,860,420 | 11/1958 | Denman, Jr. et al. ..................... | 33/1 V |
| 3,075,289 | 1/1963 | Schreuder et al. ......................... | 33/121 |
| 3,154,673 | 10/1964 | Edwards, Jr. .............................. | 33/1 V |
| 3,436,968 | 4/1969 | Unger et al. .......................... | 177/25.11 |
| 3,588,480 | 6/1971 | Unger et al. .......................... | 177/25.11 |
| 3,799,678 | 3/1974 | Kerr ......................................... | 356/169 |
| 5,276,974 | 1/1994 | Chanoni et al. ........................... | 33/546 |
| 5,305,091 | 4/1994 | Gelbart et al. ........................... | 356/375 |

FOREIGN PATENT DOCUMENTS

| | | | |
|---|---|---|---|
| 0160808 | 9/1983 | Japan ....................................... | 33/546 |
| 0020109 | 2/1985 | Japan ....................................... | 33/773 |
| 2052066 | 1/1981 | United Kingdom ..................... | 33/773 |

*Primary Examiner*—Randy W. Gibson
*Attorney, Agent, or Firm*—Charles Malandra; Melvin J. Scolnick

[57] ABSTRACT

A dimensional weighing apparatus is disclosed which has a weighing scale for determining the actual weight of a carton, and a conveyor means along which cartons are moved after being weighed to pass the cartons through a measuring station at which the length, width and height of the cartons are measured. A first measuring means measures both the height and length as the cartons move through the measuring station by means of a member that rides up the leading vertical face of the cartons to measure the height and then across the top surface thereof to measure the length. A second measuring means measures the width of the cartons as they move through the measuring station by means of carton contact members mounted along the side surfaces of the carton and move in and out of contact with the carton. Computer processing means receives the linear measurement data, calculates the volume, compares that volume with a predetermined threshold volume stored in a memory, and if greater calculates a dimensional weight of the carton and compares that with the actual weight as determined by the scale, and sends a signal indicative of the larger of these weights to a shipping system to determine an appropriate shipping charge.

14 Claims, 5 Drawing Sheets

DIMENSIONAL WEIGHING UTILIZING A FOLLOWING ARM MECHANISM

RELATED APPLICATIONS

Reference is made to application Ser. No. 08/775,850 and now U.S. Pat. No. 5,770,864 issued Jun. 23, 1998 to Dlugos, entitled APPARATUS AND METHOD FOR DIMENSIONAL WEIGHING UTILIZING A LASER SCANNER, assigned to the assignee of this application and filed on even date herewith.

Reference is made to application Ser. No. 08/775,672 entitled METHOD FOR DIMENSIONAL WEIGHING UTILIZING POINT DETERMINATION, assigned to the assignee of this application and filed on even date herewith.

Reference is made to application Ser. No. 08/775,673 entitled METHOD FOR DIMENSIONAL WEIGHING UTILIZING SPACED LINE PROJECTION, assigned to the assignee of this application and filed on even date herewith.

Reference is made to application Ser. No. 08/775,671 and now U.S. Pat. No. 5,734,476 issued Mar. 31, 1998 to Dlugos, entitled METHOD FOR DIMENSIONAL WEIGHING WITH OPTICS, assigned to the assignee of this application and filed on even date herewith.

Reference is made to application Ser. No. 08/775,549 entitled LOW COST DIMENSIONAL DETERMINING SYSTEM, assigned to the assignee of this application and filed on even date herewith.

Reference is made to application Ser. No. 08/775,851 entitled COARSE VOLUME MEASUREMENT WITH INTERLOCK, assigned to the assignee of this application and filed on even date herewith.

Reference is made to application Ser. No. 08/775,671 and now U.S. Pat. No. 5,734,476 issued Mar. 31, 1998 to Dlugos, assigned to the assignee of this application and filed on even date herewith.

Reference is made to application Ser. No. 08/775,214 entitled DIMENSIONAL WEIGHING UTILIZING A LINEAR DISPLACEMENT TRANSDUCER, assigned to the assignee of this application and filed on even date herewith.

Reference is made to application Ser. No. 08/775,213 entitled APPARATUS AND METHOD FOR DIMENSIONAL WEIGHING UTILIZING A ROTATING SENSOR, assigned to the assignee of this application and filed on even date herewith.

Reference is made to application Ser. No. 08/775,675, entitled DIMENSIONAL WEIGHING APPARATUS--. application Ser. No. 08/775,674 and now U.S. Pat. No. 5,777,746 to be issued Jul. 7, 1998 to Dlugos, entitled APPARATUS AND METHOD FOR DIMENSIONAL WEIGHING UTILIZING A MIRROR AND/OR PRISM, assigned to the assignee of this application and filed on even date herewith.

BACKGROUND OF THE INVENTION

The present invention relates generally to the concept of dimensional weighing to determine the charge required by a carrier for transporting a package or parcel, and more particularly to a dimensional weighing system suitable for use by a variety of shippers and carriers to determine accurate freight charges for packages or parcels that are considerably oversized in comparison to their actual weight.

A detailed description of the background and development of the concept of dimensional weighing, as well as the significant problems and disadvantages of prior art dimensional weighing systems, is set forth in the Background of the Invention portion of the specification in the first of the above noted applications, which is hereby incorporated herein by reference.

Briefly, the invention disclosed and claimed in that application is a dimensional weighing apparatus in which a measuring frame has three measuring arms extending from a common juncture along the three axes of a package or parcel which must be measured to determine the volume of the parcel when positioned adjacent the measuring arms with a corner of the parcel adjacent to the common juncture thereof. A plurality of optical emitters, such as LEDs, are evenly positioned along the length of the measuring arms, and either one or three optical sensors, depending on the particular embodiment of the invention, are positioned such that the sensor(s) respond to all emitters on the measuring arms that are not obscured by the parcel. A computer processing system determined the length of each of the dimensions of the package or parcel and calculates its volume, and then compares that volume with a predetermined threshold volume stored in a memory. This determines, firstly, whether the volume of the parcel is less than the predetermined threshold volume so that it can be shipped at a shipping charge based on the actual weight of the carton as determined by a suitable weighing scale, or is larger than the predetermined threshold volume and may therefore require that a dimensional weight be calculated on which a shipping charge is to be based. If the latter situation prevails, the computer processing system then compares the dimensional weight of the carton with the actual weight to determine which is larger to ensure than the shipping charge is based on the proper weight.

Two significant problems became evident with that dimensional weighing apparatus. One was that it was sometimes difficult or awkward to place a carton on the scale platform because of interference with the sensor support, which generally occupied space within or closely adjacent to the space occupied by cartons on the scale, especially large cartons. In view of the large number of packages and parcels that typically could be handled by a large shipper or carrier, anything that hindered rapid and accurate placement of cartons on the scale represented a serious problem.

Another problem was that the apparatus was relatively expensive in that a large number of emitters were utilized to provide a high degree of resolution of the optical sensing system in order to achieve a high degree of accuracy in the calculation of the volume of cartons. Thus, the dimensional weighing apparatus was not cost effective for medium or low volume shippers or carriers, with the result that they often either over or under estimated or charged, as the case may be, thereby either cheating themselves or their customers.

This problem was addressed in another dimensional weighing apparatus disclosed and claimed in the second above noted application Ser. No. 08,775,851, which apparatus has many similarities to that already described but with two significant differences. The optical sensing system was modified to provide a plurality of combined emitter/sensor units spaced along the measuring arm, each unit having an emitter and a sensor disposed immediately adjacent to each other so that light from the emitter would be reflected back to the sensor by the side of a carton placed on the scale platform. The number of emitter/sensor units so activated by the side of a carton could enable the computer processing system to calculate the linear dimensions of a carton. Another significant change was that the number of emitter/sensor units was greatly reduced from that in the previous apparatus by increasing the spacing between the units.

Although this resulted in a loss of resolution and accuracy, the computer processing means could provide a sufficiently acceptable estimate of the volume of cartons that the apparatus could be utilized with reasonable accuracy for the majority of cartons encountered in the ordinary course of many shipping situations, thereby greatly reducing the cost of the apparatus. The computer processing system could also provide the operator with a visual indication of whether the volume of a particular carton was above or below a predetermined threshold volume, above which the operator could manually measure the carton and determine an accurate shipping weight, and below which he could use the actual weight of the carton as determined by the weighing scale and still be assured of obtaining a realistic shipping charge for the carton.

Thus, the apparatus of this application was easier to use in that the operator was able to place cartons on the scale platform without interference from any supporting structure, thereby considerably increasing the speed at which cartons could be disposed on and removed from the scale. Also, it was considerably more cost effective for medium and low volume shippers and carriers because the reduction in the number of emitters utilized greatly reduced the cost of the optical sensing system, even though additional sensors were utilized because they were less expensive than those used in the first described apparatus because they were much smaller and did not have a wide included angle of vision. These advantages, however, were obtained only at the cost of considerably less resolution of the optical sensing system and consequent less accuracy in the calculation of the carton volume.

Further effort to avoid the disadvantages of the above described inventions led to the development of a dimensional weighing apparatus disclosed and claimed in third above noted application Ser. No. 08/775,675, which did not utilize an optical measuring system for measuring the linear dimensions of a carton. Rather, it utilized a mechanical measuring system in which a movable contact member was disposed in each of the measuring arms in place of the optical emitters of the earlier invention, the contact members being driven from the free ends of the measuring arms toward the opposite ends until they contacted the adjacent faces of the carton, at which point the drive for the contact members reversed direction in order to drive the contact members back to a starting position. The drive for the paddles included an optical encoder which provided the computer processing system with data indicative of the dimension of each of the sides of the carton being measured, from which the computer processing system calculated the volume of the carton and then performed the same comparisons and other calculations as performed in the earlier inventions. This apparatus had the advantage of providing a high level of accuracy in the measurements of the carton dimensions, was easy to operate, did not impede the proper placement of cartons on the scale, and was relatively inexpensive in comparison to an optical measuring system having a comparable degree of accuracy. The major disadvantage of this apparatus was still, as with the earlier forms of the apparatus, that it required a measuring frame associated with a weighing scale, which involved a piece of equipment dedicated to the dimensional weighing function, which in turn required the commitment of a substantial capital outlay for a shipper or carrier to obtain the capability of performing dimensional weighing.

Thus, there remains a need for a dimensional weighing apparatus which avoids the disadvantages of each of the above described dimensional weighing apparatuses, and therefore is sufficiently economical to be cost effective for small to medium size carriers and shippers, is easy to use, has a high throughput rate and yet is as highly accurate in measuring cartons and determining the volume thereof as the dimensional weighing apparatus with the accurate optical measuring system.

SUMMARY OF THE INVENTION

The foregoing shortcomings and disadvantages of the dimensional weighing apparatuses described above are largely obviated, if not entirely eliminated, by the dimensional weighing apparatus of the present invention. More specifically, the apparatus of the present invention provides a mechanical measuring system which very precisely measures the linear distance of the length, width and height of cartons properly positioned relative to the measuring system with neither expensive optical systems for performing the measuring function nor with any supporting structure interfering with the rapid and accurate placement of carton in proper position in association with the measuring system. A particular advantage of the apparatus of the present invention, as further explained below, is that it can be incorporated directly into various forms of package sealing apparatuses currently available, thereby achieving a considerable economic advantage by utilizing the same apparatus for both sealing and dimensional weighing functions.

In its broader aspects, the dimensional weighing apparatus of the present invention is adapted for use with a shipping system which determines an appropriate shipping charge for packages and parcels based, on an appropriate shipping weight as determined by the dimensional weighing apparatus. Within this environment, the apparatus comprises a weighing scale for determining the actual weight of cartons, a conveyor means including a measuring station along which cartons are fed, and means operatively associated with the conveyor means for measuring the length, width and height of cartons as they pass through the measuring station. There is a computer processing means that is responsive to operation of both the weighing scale and the measuring means for calculating the dimensional weight of cartons and for comparing the dimensional weight with the actual weight to determine which of these weights is the larger, which in turn determines the appropriate shipping weight that is transmitted to the shipping system which determines the shipping charge based thereon.

In some of its more limited aspects, the invention includes a first measuring means for measuring the linear dimensions of the length and height of cartons passing through the measuring station, the first measuring means including a follower means for tracking the movement of cartons through the measuring station and means mounting the follower means in the path of movement of cartons for vertical movement in response to cartons entering the measuring station and then relative horizontal movement between the follower means and the upper surface of the cartons passing through the measuring station.

The apparatus includes a second measuring means for measuring the linear dimensions of the width of cartons passing through the measuring station, the second measuring means including a sensing means disposed adjacent to the conveyer means at the measuring station for also tracking the movement of cartons through the measuring station, and means mounting the sensing means for lateral movement with respect to the conveyor means between a reference position in which the sensing means is disposed laterally out of the path of movement of any portion of the cartons passing through the measuring station and an operative position in which the sensing means contacts the side surfaces of cartons passing through the measuring station. In two alternative embodiments of this measuring means, the reference position of the sensing means is within the path of movement of the cartons and the measuring means is normally biased toward that position, and the cartons urge the sensing means to an operative position in which the sensing means contacts at least one of the side surfaces of cartons passing through the measuring station.

Both the first and second measuring means, include means responsive to the respective movements thereof for generating signals indicative of the linear dimensions of the length, height, and width of cartons passing through the measuring station.

The computer processing means for determining the shipping weight of a carton includes processing means for determining whether or not the volume of a carton exceeds a predetermined threshold volume below which the processing means determines a shipping weight based on the weight of the carton as determined by the weighing scale, and at or above which the processing means calculates a shipping weight based on the volume of the carton independent of the weight thereof as determined by the weighing scale. To accomplish this, the processing means also includes a memory storage means for storing the predetermined threshold volume, memory storage means for storing the individual linear dimensions of the length, width and height of a carton passing through the measuring station, means for calculating the volume of the carton based on the linear dimensions, and means for comparing the calculated volume of the carton with the predetermined threshold volume to determine which is the larger, so that the shipping system can determine an appropriate shipping charge for the carton based on that larger weight.

The processing means further includes a memory storage means for storing a dimensional weight constant in terms of cubic units per unit of weight, means for calculating a dimensional weight by dividing the actual volume of the carton by the dimensional weight constant, and means for comparing the actual weight with the calculated dimensional weight to determine which is the larger, which is the shipping weight on which the shipping system assesses a shipping charge.

Among the most significant advantages of the dimensional weighing apparatus of the present invention are that it can readily be adapted to be incorporated into existing carton sealing apparatus, in that several of the individual components of the package sealing apparatus can be adapted to perform dual functions, there by eliminating the necessity of having an entirely independent apparatus dedicated to the measuring function. An ancillary advantage is that there is a more efficient use of space in the work station since the measuring function can be performed while cartons are being sealed in a continuous sealing operation. The system is very operator friendly in the sense that once an operator becomes proficient at operating the carton sealing apparatus, he has become proficient at operating a substantial portion of the dimensional weighing apparatus. Finally, there is a significant cost saving in utilizing the present invention since it avoids a certain amount of duplication of apparatus.

Having briefly described the general nature of the present invention, it is a principal object thereof to provide a dimensional weighing apparatus which has advantageous features of accuracy, simplicity, convenience and speed of operation, and economy of manufacture not heretofore encountered in prior art dimensional weighing apparatus.

Another object of the present invention is to provide a dimensional weighing apparatus in which the linear dimensions of cartons are measured while the cartons are moving on a conveyor means, which may be the same conveyor means utilized to transport carton through a carton sealing machine, thereby eliminating the necessity for an independent apparatus utilized solely for the measuring function.

Still another object of the present invention is to provide a dimensional weighing apparatus in which a single measuring device is mounted in the path of movement of cartons on a conveyor means for simultaneously measuring the length and the height of cartons, while another measuring device measures the width of cartons simultaneously with the first mentioned measuring device.

A further object of the present invention is to provide a dimensional weighing apparatus in which a measuring apparatus determines the linear measurements of the length, width and height of the carton without the use of expensive optical sensing devices, but rather by utilizing relatively inexpensive mechanical measuring devices which provide highly accurate measurements.

These and other objects and features of the dimensional weighing apparatus of the present invention will be more apparent from a consideration of the following detailed description of presently preferred embodiments of the invention, when considered in conjunction with the accompanying drawings.

DETAILED DESCRIPTION OF THE PREFERRED EMBODIMENTS

Figure 1:
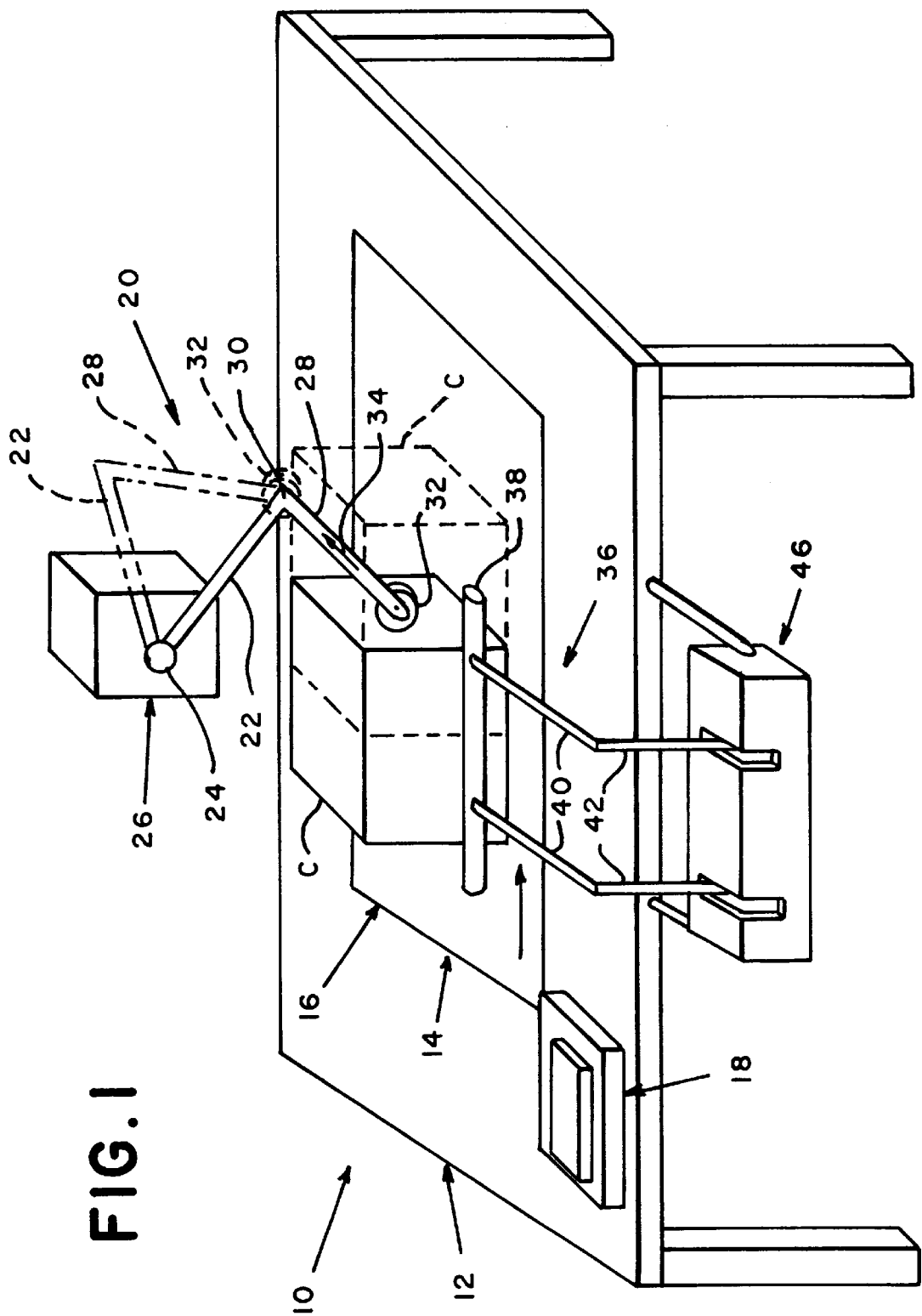
FIG. 1 is a longitudinal perspective of the major components of the dimensional weighing apparatus of the present invention.

Referring now to the drawings, and particularly to FIG. 1 thereof, the dimensional weighing apparatus of the present invention is indicated generally by the reference numeral 10. Apparatus 10 includes an elongate frame, indicated generally by the reference numeral 12, which is adapted to support the other components of the dimensional weighing apparatus 10, including a conveyor means, designated generally by the reference numeral 14, along which cartons are conveyed to and through a measuring station, designated generally by the reference numeral 16. The conveyor means 14 may be either any suitable form of powered conveyor which supports and moves cartons through the measuring station 16, or it may be merely a suitable form of roller conveyor along which cartons are moved manually. A suitable weighing scale, designated generally by the reference numeral 18, is an integral component of the dimensional weighing apparatus 10, and is illustrated as being suitably supported by the frame 12 at the input end of the conveyor, although it is not necessary that it be physically incorporated into the apparatus 10 as described thus far. It is only necessary that the weighing scale 18 be electrically connected to a computer processing means, further described below, which is also an integral component of the dimensional weighing apparatus 10 but which also need not be physically incorporated into the structure described thus far.

The dimensional weighing apparatus 10 includes a first measuring means, designated generally by the reference numeral 20, which comprises a first arm 22 connected to a shaft 24 in such a manner that it overlies the measuring station 16 and is angled downwardly from the point of connection to the shaft 24 in the direction of movement of cartons on the conveyor 14, which is left to right in FIG. 1. Shaft 24 is rotatably supported in a suitable motion detecting mechanism, designated generally by the reference numeral 26 and further described below, which is suitably mounted on a portion of the frame 12 adjacent to the measuring station 16. A second arm 28 is connected to the first arm 22 at a desired angle, typically 90°, so as to extend downwardly from the free end 30 of the arm 22 and in a direction opposite to the direction of movement of cartons on the conveyor 14, so as to be in overlying relationship to the measuring station 16. A roller 32 is rotatably mounted on the lower end of the second arm 28 so as normally to be disposed in the path of movement of cartons along the conveyor 14.

Since the shaft 24 is mounted for oscillating movement in the motion detecting mechanism 26, the first arm 22 is free to move up and down in a pivoting motion about the axis of the shaft 24 in response to the leading face of a carton contacting the roller 32, which is urged upwardly as the carton moves further in the direction of the roller 32 due to the force, indicated by the arrow 34, created in the second arm 28 established by the vertical face of the carton and the angle of the second arm 28 relative to the first arm 22. When the roller 32 reaches the top edge of the leading face of the carton, the arm 22 does not rise further, and the roller 32 merely rolls across the top surface of the carton from one end to the other. In a manner fully described below, the upward movement of the measuring arm 20 is utilized to provide a signal to the aforementioned computer processing means that is indicative of the height of the carton, and the rotation of the roller 32 across the top of the carton is utilized to provide a signal to the computer processing means that is indicative of the length of the carton. Thus, the same measuring device functions to provide the linear measurement of two dimensions of the carton as it moves into and through the measuring station 16. It should be noted that the roller 32 may correspond to the core roller in a tape sealing machine on which sealing tape is wound and which would be supported in a similar manner to that for the roller 32 so as to apply a strip of sealing tape to the upper flaps of a carton as it moved along the conveyor.

Figure 2:
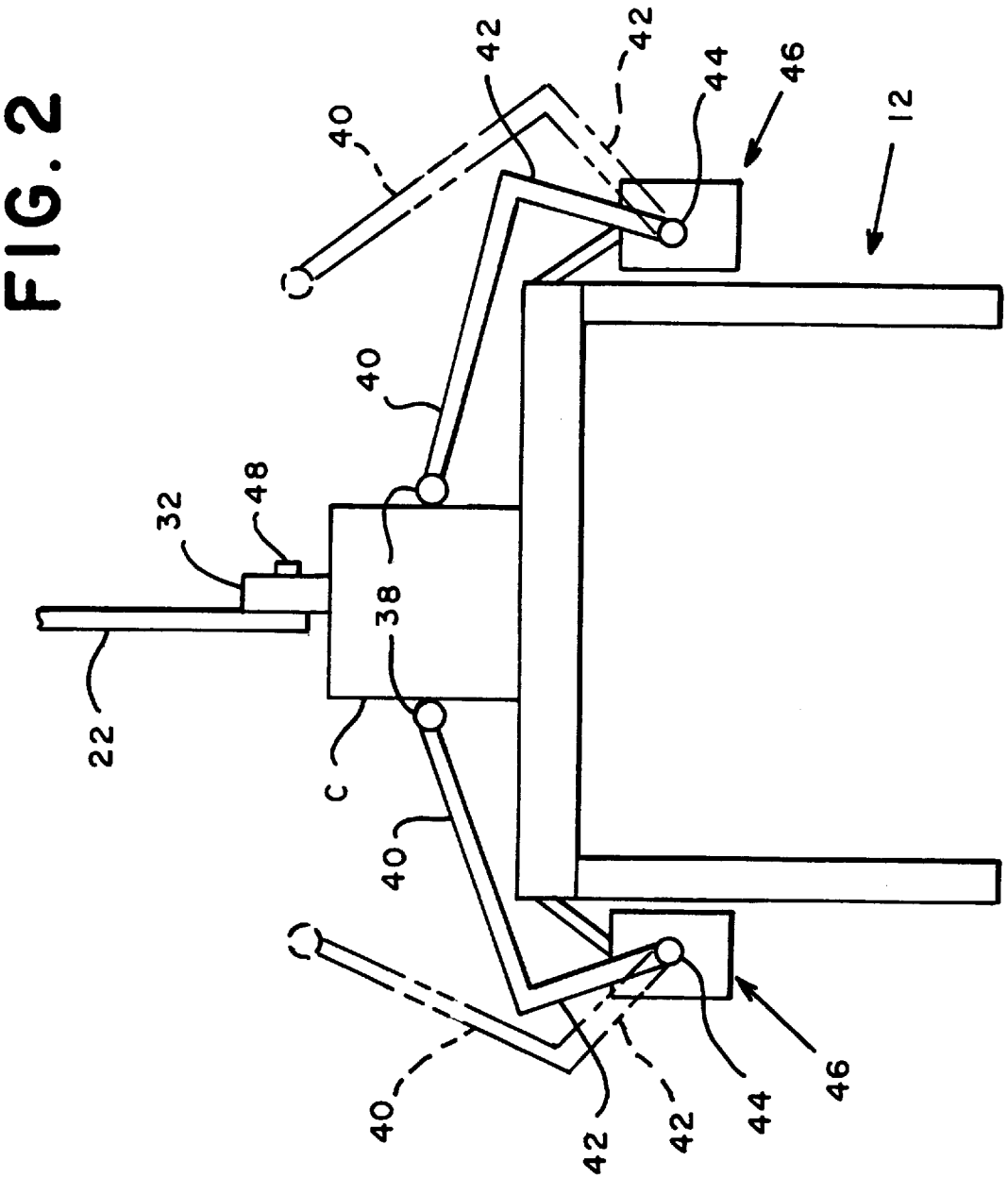
FIG. 2 is an end view of the dimensional weighing apparatus shown in FIG. 1.

As best seen in FIGS. 1 and 2, the dimensional weighing apparatus 10 also includes a second measuring means, indicated generally by the reference numeral 36, which is also mounted on a portion of the frame 12 and which includes a pair of elongate bars 38 disposed on opposite sides of a carton on the conveyor 14, each bar 38 being supported by a pair of arms 40 which are connected to another pair of arms 42 at a substantial angle so that the arms 40 and 42 form a bell crank. The lower ends of the arms 42 are connected to shafts 44 pivotally connected into another motion detecting mechanism, designated generally by the reference numeral 46, a portion of which is disposed on each side of the frame 12. As further explained below, the shafts 44 can be oscillated in opposite directions to move the elongate bars 38 from the positions shown in solid lines in FIG. 2, in which they are in contact with the sides of the carton C, to the dotted line positions in which they are out of the path of movement of any size carton that the apparatus 10 is capable of handling.

The bars 38 are normally maintained in the dotted line positions and are moved to the solid line positions by any suitable oscillatory driving means within the motion detecting mechanism 42 when a carton C is moved into and through the measuring station 16 by the conveyor 14. As further described below, this lateral movement of the bars 38 between these two positions is utilized by the motion detecting mechanism 46 to provide a signal to the aforementioned computer processing means that is indicative of the width of the carton. Again, it should be noted that the bars 38 and the above described mechanism for moving them laterally may correspond generally to the mechanism in a carton sealing machine for ensuring that a carton is properly centered on the conveyor so that the center line of the carton where the flaps meet is directly under the roll of sealing tape.

From the structure thus far described, it should be apparent that as a carton C is moved along the conveyor 14, the three dimensions required for determining the volume of the carton are measured substantially simultaneously, in that the upward movement of the arm 22 caused by the upward movement of the roller 32 measures the height, the relative movement of the roller 32 along the top of the carton measures the length, and the lateral movement of the side bars 38 from the dotted line position into contact with the side surfaces of the carton measure the width, all as more fully described below.

There are numerous techniques and devices well known in the art for measuring linear or angular movement of various mechanical parts, and it is to be understood that the principles of the present invention do not depend on the use of any particular type of such measuring device. Thus, the following description of the linear and angular measuring devices is for the purpose of illustration only and is not to be interpreted in a restrictive sense.

Figure 3:
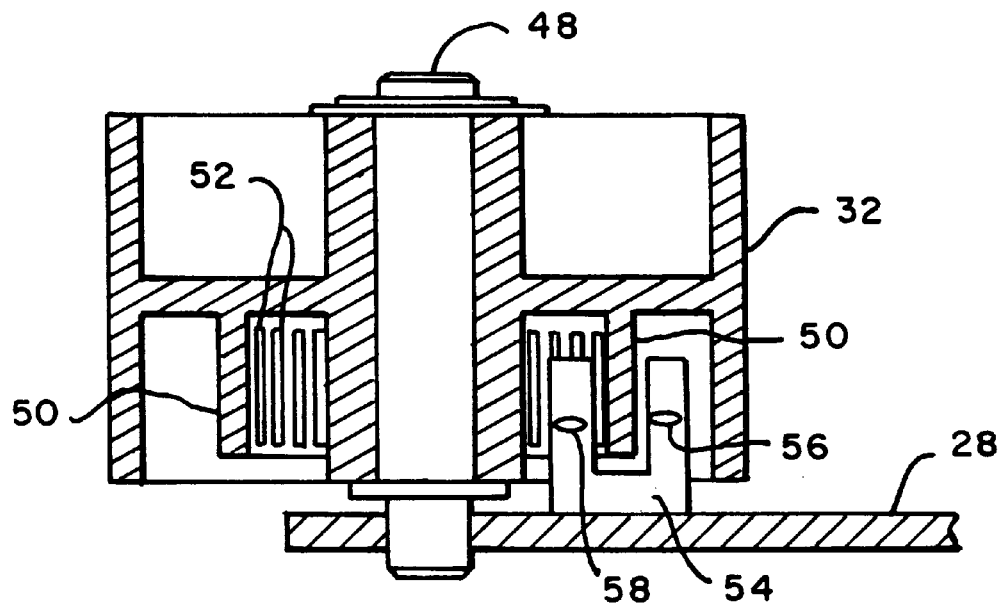
FIG. 3 is a side sectional view of the roller and optical encoder utilized for measuring the length of cartons.

One form of device for measuring linear distance by means of a roller is through the use of an optical encoder, and FIG. 3 illustrates the manner in which this device can be incorporated into the roller 32. Thus, with reference to FIG. 3, it will be seen that the roller 32 is rotatably mounted on a shaft 48 that is fixed to the free end of the arm 28. The roller 32 includes a concentrically mounted rotor 50 which is provided with a plurality of slots 52 that extend entirely around the rotor 50. A photocell assembly 54 is suitably affixed to the arm 28 and includes an optical emitter 56 and a sensor 58 for detecting light from the emitter 56 and responding thereto to generate an electrical signal. Thus, it will be apparent that as the roller 48 rotates in response to moving across the top surface of a carton on the conveyor, successive slots 52 pass by the photocell assembly 54 and permit the emitter 56 to actuate the sensor 58 in synchronism with the movement of the slots. Each time the sensor is so activated, it sends a pulse via the measuring means 26 to an encoder counter located in the computer processing means, further described below, which accumulates the pulses from the encoder assembly 54 each time the measuring means 26 completes a cycle of operation for a particular carton.

Figure 4:
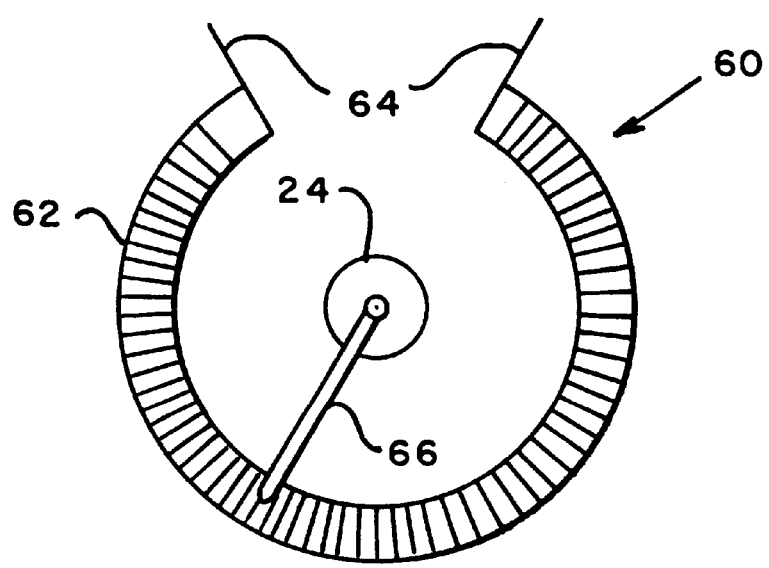
FIG. 4 is a side view of the apparatus shown in FIG. 1.

The measuring means 26 also includes a means for measuring the angular motion of the shaft 24 in response to the pivotal movement of the arm 22. Again, a variety of devices are available to perform this function, but for the purpose of illustration, as seen in FIG. 4, the measuring means 26 includes a potentiometer, indicated generally by the reference numeral 60, having a coil 62 through which a voltage is applied as by the leads 64, and a tap 66 suitably connected to the shaft 24 for angular movement therewith. The tap 66 is connected to a voltage converter 68 which has the capability of converting a change in voltage from a reference voltage to the voltage tapped off the coil 62 by the tap 66 after a given movement into a linear equivalent of the angular movement of the shaft 24, as more fully explained below.

It should be apparent without further description that a substantially identical arraignment for determining angular movement can be applied to one or the other, or both, of the shafts 44 that control the lateral movement of the bars 38, thereby providing an indication of the extent of such lateral movement as cartons of different widths are moved through the measuring station.

Figure 5:
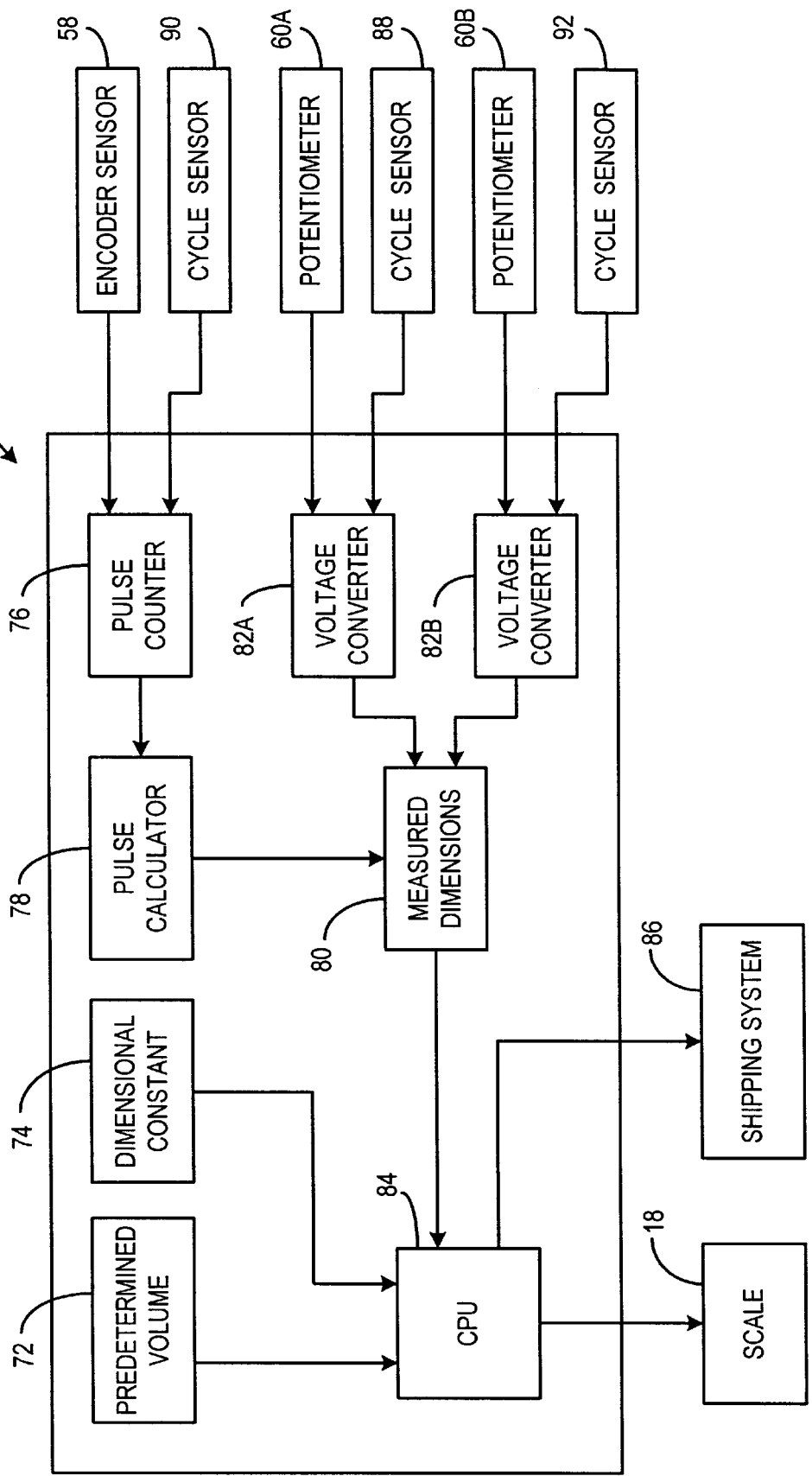
FIG. 5 is a schematic diagram of the major components of the electronic control system for the dimensional weighing apparatus of the present invention.

FIG. 5 illustrates schematically the major components of an electronic control system for controlling the operation of the previously described apparatus and for determining a shipping weight for a carton disposed on the conveyor based on converting the actual or dimensional weight, as the case may be, of a carton into a shipping weight which is transferred to a shipping system which converts that weight into an appropriate shipping charge. It should be understood that the specific components described and shown herein are illustrative of the type of components required to perform the functions which are carried out by the apparatus of the present invention, and that other specific components may be utilized to achieve these functions.

The electronic control system includes a computer processing means 70 having a suitable processor unit which controls the operation of the apparatus 10 for determining the linear dimensions of a carton on the conveyor 14, calculating the volume thereof, comparing that volume with a predetermined threshold volume, calculating a dimensional weight for the carton and determining a shipping weight based on whether the dimensional weight is greater or less than the actual weight as determined by the scale 20.

Thus, the computer processing means 70 includes a first settable memory storage device 72 which stores a predetermined threshold volume that represents the volume of a carton, typically in the order of one cubic foot regardless of actual dimensions, below which the shipping weight would be calculated on the basis of the actual weight of the carton, and above which the shipping weight would be calculated on the basis of the dimensional weight of the carton. The computer processing means 70 also a includes a second settable memory storage device 74 which stores a variable dimensional weight constant, the amount of which can depend on the preference of a particular carrier, and which is used for converting the actual volume of a carton into a calculated dimensional weight. For the purpose of this determination, dimensional weight is defined as the cubic volume per unit of weight, the actual amounts depending on whether measurements are made using the English or metric measuring systems; for example, the constants generally adopted in the United States for the dimensional weight of cartons for shipping weight purposes is 194 cubic inches per pound for domestic service and 166 cubic inches per pound for international service. Thus, once the actual volume of a carton is determined, that volume is divided by 194 or 166 respectively to determine the dimensional weight of the carton in pounds. The conversion of this dimensional weight into a shipping charge is further explained below.

The computer processing means 70 also includes a pulse counter 76 which is suitably connected to the photocell sensor 58 to receive successive pulses therefrom in response to rotation of the slotted rotor 50. The pulse counter 76 counts the pulses from the sensor 58 during a cycle of operation of the roller 32 in measuring the length of a carton as described above, and transmits the total pulse count to a suitable calculating component 78 which converts the pulse count into a linear dimension, which is then transmitted to a third memory storage device 80 which stores the linear dimension for further processing as further described below.

The computer processing means 70 also includes a first voltage converter 82A which is connected to the potentiometer 60A for the shaft 24 that is rotated by the arm 22 to measure the length of a carton. A second voltage converter 82B is connected to the potentiometer 60B for the shafts 44 that are rotated by the arms 42 to measure the width of a carton. The voltage converters 82A and 82B transmit the linear dimensions for the height and width respectively to the third memory storage device 80 in the same manner as the pulse calculator 78. The third memory storage device 80 is connected to a central processing unit (CPU) 84, which is the main control component for the dimensional weighing apparatus 10.

Weighing scale 18, regardless of its actual location with respect to the dimensional weighing apparatus 10, is suitably connected to the CPU 84. The first memory storage device 72 holding the predetermined threshold volume, the second memory storage device 74 holding the dimensional constant and the third memory storage device 80 holding the linear dimensions of the length, width and height are also connected to the CPU 84 so as to transmit the predetermined threshold volume, dimensional constant and linear dimension data from these memory storage devices respectively to the CPU 84. The CPU 84 has the capability of calculating the volume of the carton from the linear dimensions stored in the third memory storage device 80, and then comparing that volume with the predetermined threshold volume from the first memory storage device 72 to determine whether the actual volume is above or below the predetermined threshold volume. The CPU 84 also has the capability of determining the dimensional weight of the carton by dividing the calculated volume by the dimensional constant stored in the second memory storage device 74, and then comparing the dimensional weight with the actual weight of the carton, as determined by the scale 20, to determine which of the two weights is the larger, which would be the shipping weight for that carton.

The CPU 84 has the further capability of sending a signal indicative of that weight to a shipping system, designated generally by the reference numeral 86. Shipping system 86 is typically a rather complex processing system which forms no part of the present invention and therefore need not be further described other than to mention that it would include a computer processing unit that would store individual carrier rates for different amounts of weight, carrier classes, destination zip codes, and other relevant information, and would respond to the incoming signal that is indicative of the shipping weight by calculating an appropriate shipping charge for the carton. It should be noted that the computer processing means 70 and all of the components contained therein could be physically located in the shipping system 86 rather than with the dimensional weighing apparatus 10. It is only necessary for complete implementation of the present invention that the computer processing means 70 be interconnected between the first and second measuring means 26 and 36, on the one hand, and the shipping system 86 on the other, with the physical location of the computer processing means 70 being a matter of choice.

The operation of the apparatus thus far described is as follows: During a set up phase of the dimensional weighing apparatus 10, the computer processing means 70 is set so as to place a minimum or threshold volume into the first memory storage device 72. For the purpose of illustration in the following description of operation, this volume will be considered to be 1728 cubic inches, or one cubic foot. It should be understood that this volume does not necessarily literally mean a cubic foot, i.e., a carton that is 12"×12- by 12", but rather any combination of length, width and height that, when multiplied together, equals 1728 cubic inches.

During operation, a carton C is placed on the conveyor 14 after it has been weighed by the scale 18, which for the purpose of this illustration, is assumed to be 10 pounds, and this weight is transferred to the CPU 84 as above described. The conveyor 14 moves the carton C toward the measuring station 16 until the leading face thereof contacts the roller 32, at which point further forward motion of the carton C causes the roller 32 to move upwardly along the leading face thereof, thereby raising the arms 28 and 22 from the solid line positions to the dotted line positions as illustrated in FIG. 1. This movement rotates the shaft 24 in a counter clockwise direction through a certain angle, which rotates the tap 66 in relation to the coil 62 of the potentiometer 60A. This causes a different voltage to be transmitted to the voltage converter 82A from that which prevailed prior to any movement of the shaft 24, and the difference between the voltages is converted by the voltage converter 82A into a linear dimension indicative of the height of the carton C, which is then transmitted to the third memory storage device 80 and stored therein.

In should be noted that, in actual practice, the lower most position of the roller 32 is spaced above the conveyor 14 by a predetermined distance that represents a minimum height that the dimensional weighing apparatus 10 is capable of measuring, and this minimum height is stored in memory in the CPU 84, so that any upward movement of the roller 32 in measuring the height of a carton is automatically added to the minimum height, thereby eliminating the necessity for the roller 32 to initially contact the leading face of a carton at the level of the bottom surface thereof.

When the roller 32 reaches the upper forward edge of the carton C, it does not rise any further, thereby terminating the height measuring cycle. Any suitable form of device for detecting the beginning and end of a cycle is provided, as indicated by the box 88 in FIG. 5, such as an electronic voltage sensor that senses the beginning and end of a change in voltage or an optical sensor positioned to detect the beginning and end of upward movement of the arms 22 and 28 which sends a signal to the voltage converter 82A that the height measuring cycle has been completed and that the maximum voltage difference has been reached. This signal will cause the voltage converter 82A to convert the difference in voltage to a linear dimension, which is transmitted to the third memory storage device 80.

At this point, the roller 32 commences a rolling action relative to the top surface of the carton C, usually along the seam between the upper carton flaps, as the carton C continues to be moved by the conveyor 14. The rotary motion of the roller 32 causes the slots 52 on the rotor 50 so pass by the light emitter 56 of the photocell assembly 54, thereby successively activating the sensor 58 to send pulses to the pulse counter 76. This continues until the carton C has moved sufficiently far to bring the rollers 32 to the upper rear edge of the carton C, at which point the roller 32, arms 28 and 22 and shaft 24 all return to their initial positions, thereby completing the length measuring cycle. Again, any suitable form of end of device for detecting the beginning and end of a cycle is provided, as indicated by the box 90 in FIG. 5, which may be the same or similar to those described above for sensing the termination of the height measuring cycle, which senses when the roller 32 reaches the upper rear edge of the carton C and sends a signal to the pulse counter 76 that the length measuring cycle has been completed, which in turn causes the pulse calculator 76 to convert the total pulse count from the pulse counter 76 into a linear dimension, which is then transmitted to the third memory storage device 80.

At some point during the movement of the carton C through the measuring station 16, the CPU 84 will cause an appropriate control in the second measuring means 42 to rotate the shafts 44 to move the carton contact bars 38 from their standby positions shown in dotted lines in FIG. 2 into contact with the side faces of the carton. This angular movement of the shafts 44 can be sensed in a number of different ways, but preferably is sensed in the same manner as that described above for the shaft 24 in the first measuring means 26, so that the description thereof need not be repeated, other than to note that either one or both of the shafts 44 are connected to the tap of a second potentiometer 60B in order to provide a voltage difference between the two positions of the shafts 44 and the carton contact bars 38, which is transmitted to the voltage converter 82B which converts the voltage difference into a linear dimension that is indicative of the width of the carton C. Again, any suitable form of device for detecting the beginning and end of a cycle can be provided, as indicated by the box in FIG. 5, which senses that the carton contact bars 38 have contacted the side surfaces of the carton C and that this cycle is now complete, and which sends a signal to the voltage converter 82B to convert the difference in voltage to a linear dimension, which is transmitted to the third memory storage device 80.

At this point, all of the linear dimensions necessary to calculate the volume of the carton C have been taken and stored in the third memory storage device 80. The CPU 84 now commences its volume and dimensional weight calculating functions described above. Again, for the purpose of illustration, it is assumed that the carton C actually measures 12 inches in height, 14 inches in length and 8 inches in width, and these are the dimensions stored in the third memory storage device 80. The CPU 84 then performs three functions. It receives the linear dimensions from the memory storage device 80 and calculates the actual volume of the carton, which, in the illustration given, would 1344 cubic inches. The CPU 84 then compares this volume against the predetermined threshold volume stored in the memory storage device 72, and determines that it is considerably less than the predetermined threshold volume of 1728 cubic inches, which means that the shipping weight for the carton will be the same as the actual weight as determined by the scale 18, i.e., 10 pounds, and further calculation of a dimensional weight is not necessary. The CPU 84 then sends a signal to the shipping system 86 which is indicative of the actual weight of the carton so that the shipping system 86 can determine the appropriate shipping charge. In addition, the shipping system 86 may print out a manifest of the charges for all cartons dimensionally measured during a predetermined period of time, and also print individual address labels for each carton, typically with bar coded information thereon.

If, on the other hand, the carton C still weighs only 10 pounds, but the linear dimensions are now, for example, 15 inches high, 23 long and 12 inches wide, the same procedure as described above would occur to determine the linear dimensions of the carton, except that the calculated volume of the carton would now be 4140 cubic inches, far in excess of the predetermined threshold volume of 1728 cubic inches, which means that further calculation of a dimensional weight is necessary. The CPU 84 then determines the dimensional weight of the carton, by dividing the calculated volume of 4140 cubic inches by the dimensional constant stored in the second memory storage unit 74, which in the example is assumed to be the domestic shipping standard of 194 cubic inches per pound, and determines that the dimensional weight is 21.34 pounds. The CPU 84 then compares this weight to the actual weight of the carton as determined by the scale 18 to determine which weight is the larger. In the example given, since the dimensional weight of 21.34 pounds is the larger, the CPU 84 sends a signal indicative of this weight to the shipping system 86, which then determines the appropriate shipping charge for 21.34 pounds in the same manner as it did for the smaller carton for which the shipping weight was determined to be 10 pounds.

If, on the other hand, the actual weight of this carton had been 25 pounds, the CPU 84 would calculate the dimensional weight of the carton in the manner described above, and would determine that the actual weight of 25 pounds exceeds the dimensional weight of 21.34 pounds, which means that the actual weight of the carton C should be used as the shipping weight. The CPU 84 would then send a signal indicative of this weight to the shipping system 86 for determination of the appropriate shipping charge.

Figure 6:
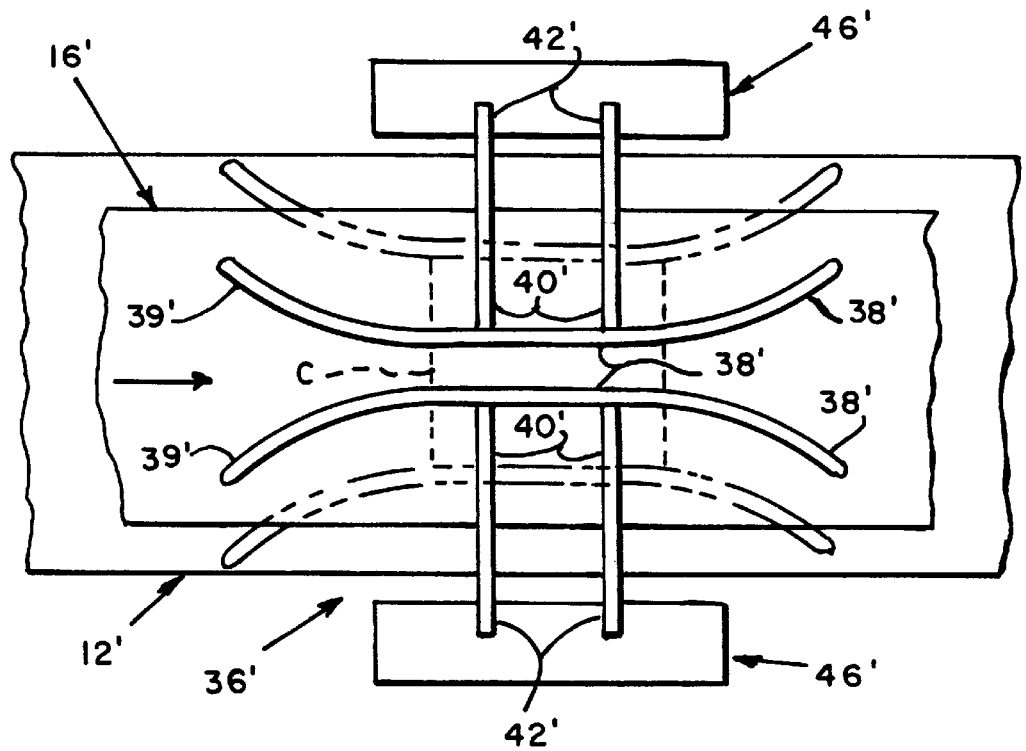
FIG. 6 is a partial plan view of the apparatus shown in FIG. 1 illustrating an alternative embodiment of the carton width measuring means.

FIG. 6 illustrates another embodiment of the invention which includes a modified form of second measuring means 36. In this form, the bars 38' are mounted on the arms 40' which are connected to the arms 42' which, in turn are pivotally connected into the motion detecting mechanisms 46' suitably mounted on both sides of the conveyor 14', all in a manner similar to the comparable structure described above for the previous embodiment. The significant difference is that in this embodiment, the bars 38' are normally disposed adjacent to one another at a normal reference point at which they are as close together as the mechanism permits, and the motion detecting mechanisms 46 include suitable spring or other biasing devices which normally urge and maintain the bars 38' in the positions shown in solid lines in FIG. 6, but which permits them to separate, as indicated by the dotted line positions in FIG. 6 as a carton presses against the curved input portions 39' of the bars 38'. Again, as with the previous embodiment of this measuring means, as the bars 38 move apart in response to a carton moving into the measuring station 16, the rotational motion of the shaft to which the arms 42 are connected is measured to determine the linear distance of the width of the carton in the same manner as that described above.

Figure 7:
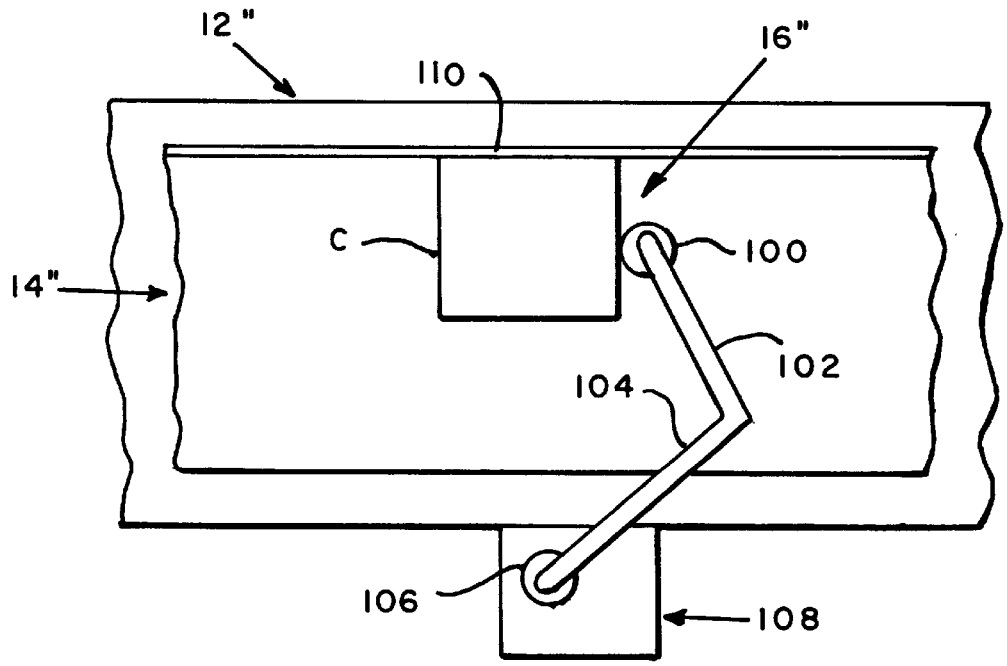
FIG. 7 is a view similar to FIG. 6 illustrating another alternative embodiment of the carton width measuring means.

FIG. 7 illustrates still another embodiment of the invention which includes another modified form of the second measuring means 36. This form of the second measuring means 36 is similar in principle to the first measuring means 20 of the embodiment of the invention shown in FIGS. 1 through 4, in that a roller is mounted on arm 102 which is connected to another arm 104 at approximately a 90° angle thereto, the arm 104 being mounted on a shaft 106 which in turn is mounted for rotation in a motion detecting mechanism 108 which is substantially identical to the motion detecting mechanism 26 described above. Also, the conveyor 14" of this embodiment includes an upstanding guide rail 110 suitably secured to a surface of the frame 12" which extends along the length of the conveyor 14" against which the edge of the carton C moves in order to properly locate the moving carton through the measuring station 16". It should be apparent without further description that the width of the carton C is measured by detecting the rotary motion of the shaft 106 in response to movement of the roller 100 and arms 102 and 104 in the same manner as it was with the motion detecting mechanisms 46 and 46' of the previous embodiments. It should also be noted that, if desired, the motion detecting mechanism 106 could also be utilized to measure the length of the carton C by providing the roller 100 with the same or similar optical encoder mechanism as is illustrated in FIG. 3 for the first described embodiment, in which case the second measuring means 108 is performing a dual measuring function and the first measuring means, i.e., a roller moving across the top of the carton, would be measuring only the height.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

I claim:

1. Dimensional weighing apparatus adapted for use with a shipping system which determines an appropriate shipping charge for packages and parcels based on an appropriate shipping weight as determined by said dimensional weighing apparatus, said dimensional weighing apparatus comprising:

(a) a weighing scale for determining the actual weight of cartons;

(b) conveyor means including a measuring station along which cartons are fed;

(c) first measuring means for measuring the length, of cartons as they pass through said measuring station;

(d) second measuring means for measuring the width and height of cartons as they pass through said measuring station; wherein said second measuring means further comprises:

(i) a first arm connected to a shaft wherein said shaft is rotatable supported by motion detecting means for measuring movement of said cartons;

(ii) a second arm connected to said first arm at a predetermined angle extending downwardly and in overlying relationship to said measuring station; and (iii) a roller rotatable mounted on the downward end of said second arm; and (e) computer processing means responsive to operation of said weighing scale and said measuring means for determining a shipping weight of said cartons by calculating the dimensional weight thereof and comparing said dimensional weight with said actual weight to determine which of said weights is the larger, whereby said dimensional weighing apparatus determines the appropriate shipping weight that is transmitted to the shipping system and on which the shipping system determines an appropriate shipping charge.

2. Dimensional weighing apparatus as set forth in claim 1, wherein said measuring means comprises:

(a) first measuring means for measuring the length and the height of a cartons as they move along said conveyor means through said measuring station on said conveyor means; and (b) second measuring means for measuring the width of cartons as they move through said measuring station.

3. Dimensional weighing apparatus as set forth in claim 2, wherein said first measuring means comprises:
   (a) follower means for tracking the movement of cartons through said measuring station; and
   (b) means mounting said follower means in the path of movement of cartons through said measuring station for vertical movement in response to cartons entering said measuring station and then relative horizontal movement between said follower means and the upper surface of cartons passing thereunder through said measuring station.

4. Dimensional weighing apparatus as set forth in claim 3, wherein said first measuring means further comprises means responsive to said vertical movement and said relative horizontal movement of said first measuring means for generating signals indicative of the linear dimensions of the length and height of cartons passing through said measuring station.

5. Dimensional weighing apparatus as set forth in claim 2, wherein said second measuring means comprises:
   (a) sensing means disposed adjacent to said conveyor means at said measuring station for also tracking the movement of cartons through said measuring station; and
   (b) means mounting said sensing means for lateral movement with respect to said conveyor means between a reference position and an operative position in which said sensing means senses the side surfaces of cartons passing through said measuring station.

6. Dimensional weighing apparatus as set forth in claim 5, wherein said second measuring means further comprises means responsive to said lateral movement of said sensing means for generating signals indicative of the linear dimensions of the width of cartons passing through said measuring station.

7. Dimensional weighing apparatus as set forth in claim 6, wherein:
   (a) said sensing means comprises a pair of carton contact members normally disposed on opposite lateral sides of said measuring station at said reference positions for said contact members which are disposed entirely out of the path of movement of cartons passing through said measuring station; and
   (b) said second measuring means further comprises means for moving said carton contact members from said reference positions to said operative positions while a carton is passing through said measuring station.

8. Dimensional weighing apparatus as set forth in claim 6, wherein:
   (a) said sensing means comprises a pair of carton contact members normally disposed on opposite lateral sides of said measuring station at said reference positions for said contact members which are disposed within the path of movement of cartons passing through said measuring station; and
   (b) said second measuring means further comprises biasing means normally maintaining said contact members at said reference positions and yielding to the force of a carton moving into said measuring station to permit said contact members to move apart laterally until said contact members contact the side surfaces of the carton.

9. Dimensional weighing apparatus as set forth in claim 6, wherein:
   (a) said sensing means comprises a carton contact member disposed adjacent one lateral side of said measuring station at said reference position for said contact member which is disposed within the path of movement of carton passing through said measuring station and means mounted adjacent the opposite lateral side of said measuring station for supporting said contact member for lateral movement within said measuring station; and
   (b) said second measuring means further comprises biasing means normally maintaining said contact member at said reference position adjacent to said one side of said measuring station and yielding to the force of a carton moving into said measuring station to permit said contact member to move toward said opposite side of said measuring station until said contact member reaches the end of the carton surface urging said contact member toward said opposite side of said measuring station.

10. Dimensional weighing apparatus as set forth in claim 2, wherein:
    (a) said first measuring means comprises follower means for tracking the movement of cartons through said measuring station, and means mounting said follower means in the path of movement of cartons through said measuring station for vertical movement in response to cartons approaching said follower means and then relative horizontal movement between said follower means and the upper surface of cartons passing thereunder through said measuring station;
    (b) said second measuring means comprises sensing means disposed adjacent to said conveyor means at said measuring station for also tracking the movement of cartons through said measuring station, and means mounting said sensing means for lateral movement with respect to said conveyor means between a reference position in which said sensing means is disposed laterally out of the path of movement of any portion of the cartons passing through said measuring station and an operative position in which said sensing means contacts the side surfaces of cartons passing through said measuring station; and
    (c) means responsive to said vertical movement and said relative horizontal movement of said first measuring means for generating signals indicative of the linear dimensions of the length and height of carton passing through said measuring station, and said lateral movement of said second measuring means for generating signals indicative of the linear dimensions of the width of cartons passing through said measuring station.

11. Dimensional weighing apparatus as set forth in claim 1, wherein said computer processing means for determining the shipping weight of said carton passing through said measuring station comprises means for determining whether or not the actual volume of the carton exceeds a predetermined threshold volume below which said processing means determines a shipping weight based on said actual weight of the carton as determined by said weighing scale, and at or above which said processing means calculates a shipping weight based on the volume of the carton independent of the weight thereof as determined by said weighing scale.

12. Dimensional weighing apparatus as set forth in claim 11, wherein said means for determining whether or not the volume of the carton exceeds a predetermined threshold volume comprises:
    (a) memory storage means for storing said predetermined threshold volume;
    (b) memory storage means for storing the individual linear dimensions of the length, width and height of a carton passing through said measuring station;

(c) means for calculating the volume of the carton based on said linear dimensions; and (d) means for comparing the calculated volume of the carton with the predetermined threshold volume to determine which is the larger.

13. Dimensional weighing apparatus as set forth in claim 12, wherein said processing means for determining the shipping weight of said carton passing through said measuring station further comprises means for converting the actual volume of the carton into a dimensional weight thereof and for comparing the dimensional weight with the actual weight to determine which is the larger.

14. Dimensional weighing apparatus as set forth in claim 13, wherein said means for converting the actual volume of a carton into dimensional weight thereof and for comparing the dimensional weight with the actual weight comprises:

(a) memory storage means for storing a dimensional weight constant in terms of cubic units per unit of weight;

(b) means for calculating a dimensional weight by dividing the actual volume of the carton by said dimensional weight constant; and (c) means for comparing said actual weight of the carton with said dimensional weight thereof to determine which is the larger.

* * * * *